No. 634,073. Patented Oct. 3, 1899.
C. H. VEEDER.
REGISTERING COUNTER.
(Application filed May 17, 1899.)
(No Model.)
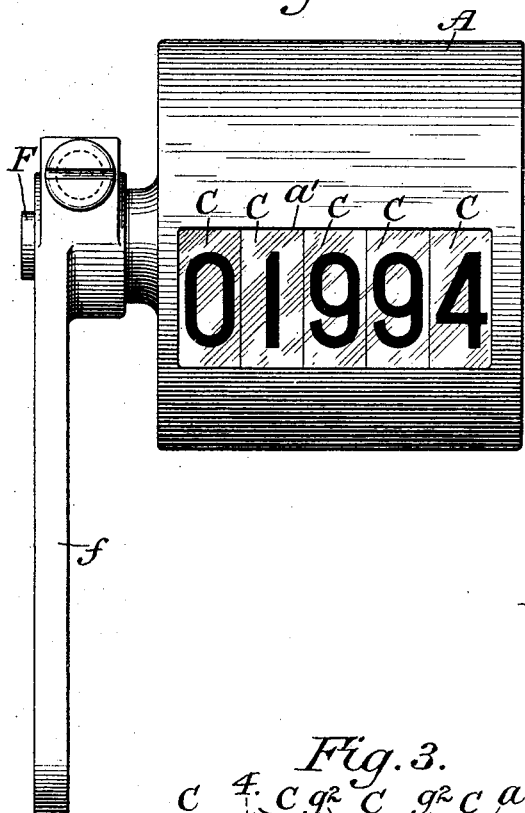
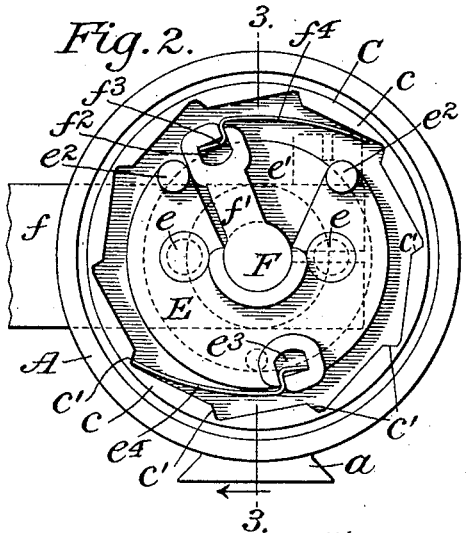
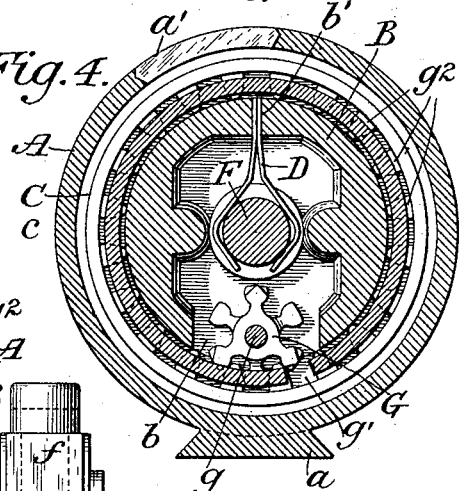
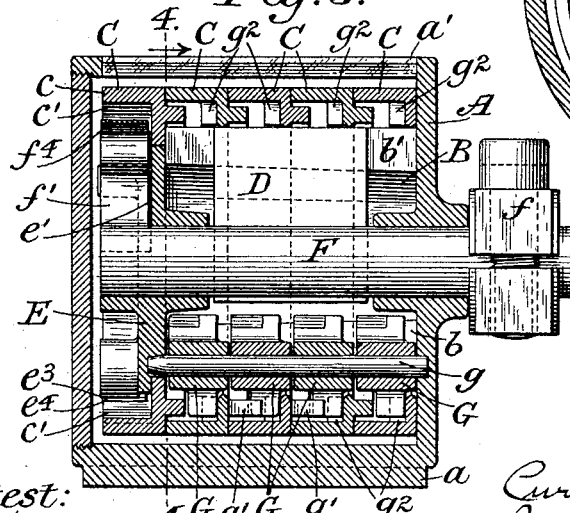
Inventor:
Curtis Hussey Veeder
by Redding, Kiddle & Greeley
Attys.
Attest:
A. N. Jesbera
L. R. Moore

UNITED STATES PATENT OFFICE.

CURTIS HUSSEY VEEDER, OF HARTFORD, CONNECTICUT, ASSIGNOR TO THE VEEDER MANUFACTURING COMPANY, OF SAME PLACE.

REGISTERING-COUNTER.

SPECIFICATION forming part of Letters Patent No. 634,073, dated October 3, 1899.

Application filed May 17, 1899. Serial No. 717,138. (No model.)

*To all whom it may concern:*

Be it known that I, CURTIS HUSSEY VEEDER, a citizen of the United States, residing in the city of Hartford, county of Hartford, State of Connecticut, have invented certain new and useful Improvements in Registering-Counters, of which the following is a specification, reference being had to the accompanying drawings, forming a part hereof.

This invention relates to counting devices such as are employed to register the number of movements or operations of printing-presses and other machines or parts of machines, and has for its object to provide such a device which shall be simple and compact in construction, efficient and reliable in operation, and not subject to breakage or derangement of parts.

The invention will be more fully described hereinafter with reference to the accompanying drawings, in which—

Figure 1 is a plan view of a counter which embodies the improvements. Fig. 2 is an end view of the same with the end plate removed and the actuating-arm broken off. Fig. 3 is a longitudinal section on the plane indicated by the line 3 3 of Fig. 2. Fig. 4 is a transverse section on the plane indicated by the line 4 4 of Fig. 3.

The counter represented in the drawings is provided with a casing A, which is substantially circular in cross-section, and is provided with suitable means, such as the lug $a$, by which it can be secured in position. A sight-opening $a'$ is formed in the casing to permit the record of the counter to be observed. A hub or boss B is formed in or secured to the casing concentrically therewith and serves to support the index-wheels C, which are mounted thereon, said hub being slotted, as at $b$, to receive the transmission devices, hereinafter described, and at $b'$ to receive the brake or friction device D. The end of the boss or hub is closed by a cap E, which is secured in position by pins $e$ or other suitable means. Said cap forms an extension of the boss or hub, supports the first index-wheel C, and also forms a bearing for the actuating-shaft F, the other bearing therefor being formed in the end of the casing A.

Said shaft F receives at one end an arm $f$ for connection to the moving part of the machine, by which the oscillations of the shaft are effected, and at the other end an arm $f'$, which plays in segmental recess $e'$, the sides of which or studs $e^2$ limit the movement of said arm $f'$. The end of the arm $f'$ is slotted radially and transversely, as at $f^2$, for the engagement therewith of the doubly-bent end $f^3$ of a spring actuating-pawl $f^4$. A similar slot at $e^3$ in the periphery of the cap E is provided for the engagement therewith of the doubly-bent end of a spring-detent or hold-pawl $e^4$. The flange $c$ of the first index-wheel C is formed on its inner surface with ratchet-teeth $c'$ for engagement by the actuating-pawl $f^4$ and the hold-pawl $e^4$. It will now be evident that as the shaft F is oscillated the first index-wheel C will be advanced step by step and that the actuating and hold pawl will without fail engage the ratchet-teeth of such index-wheel, insuring its proper movement and preventing any backward movement.

The friction-brake D, applied to the shaft F to prevent too free movement thereof, consists of two bent spring-plates secured in the slot $b'$ of the boss or hub B and embracing the shaft between them.

The transmission devices between successive index-wheels are not concerned with the present invention, and any suitable devices may be employed. As represented in the drawings, transmission and locking pinions G, mounted on a pin $g$, are actuated each by a single tooth or tooth-space $g'$ provided in the flange of each index-wheel, and upon each complete rotation of such index-wheel advance the next index-wheel one space through engagement with teeth $g^2$, formed on a flange of the next successive wheel.

It will be evident that the improved counter is not only compact in construction and reliable in operation, but that its parts, so far as concerns the present invention, can be formed and assembled with a minimum of expense and can be replaced easily in case of wear.

I claim as my invention—

1. The combination with the casing open at one end and having a sight-opening, a removable end plate closing the open end of the casing, a tubular hub extending longitudinally within the casing from its closed end, index-wheels turning on said hub, a cap on the open end of the hub and upon which the first, internally-toothed, index-wheel turns; the said cap having in its periphery, a pawl-receiving slot and in its outer face a segmental recess, a spring stop-pawl secured in said peripheral recess and engaging the internal teeth of the first numbering-wheel, transmission devices between the successive index-wheels, an oscillating shaft extending through the hub and having its bearings in the closed end of the casing and the hub-cap, an arm projecting from the inner end of the shaft within the said segmental recess and provided with a slot in its free end, and a spring actuating-pawl secured in said arm-slot, and at its free end engaging the teeth of the first numbering-wheel to rotate it; substantially as described.

2. The combination with a casing having a sight-opening, of a boss or hub in said casing, said boss or hub having a longitudinal slot, index-wheels mounted on said boss or hub, a shaft mounted within said hub, devices for transmitting motion from said shaft to the first index-wheel, transmission devices between successive wheels, and spring-plates having their ends inserted in said slot and embracing said shaft between them, substantially as shown and described.

This specification signed and witnessed this 15th day of May, A. D. 1899.

CURTIS HUSSEY VEEDER.

In presence of—
  E. BARRIE SMITH,
  H. W. LESTER.